(12) United States Patent
Gao et al.

(10) Patent No.: US 11,347,119 B2
(45) Date of Patent: May 31, 2022

(54) ELECTRONIC DEVICE AND SCREEN MODULE

(71) Applicant: BEIJING XIAOMI MOBILE SOFTWARE CO., LTD., Beijing (CN)

(72) Inventors: Jing Gao, Beijing (CN); Shaoxing Hu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,031

(22) Filed: Nov. 28, 2019

(65) Prior Publication Data
US 2020/0225522 A1 Jul. 16, 2020

(30) Foreign Application Priority Data
Jan. 16, 2019 (CN) .......................... 201910039526.3

(51) Int. Cl.
*G02F 1/1343* (2006.01)
*G02F 1/15* (2019.01)
(Continued)

(52) U.S. Cl.
CPC ........ *G02F 1/13439* (2013.01); *G02F 1/1339* (2013.01); *G02F 1/133302* (2021.01); *G02F 2201/52* (2013.01)

(58) Field of Classification Search
CPC ........ G02F 1/153; G02F 1/1533; G02F 1/157; G02F 1/1334; G02F 2001/1502;
(Continued)

(56) References Cited

U.S. PATENT DOCUMENTS

2017/0123575 A1* 5/2017 Evans, V ............. H04N 5/2254
2019/0208044 A1* 7/2019 Lee ..................... H01L 27/3227
2020/0220955 A1* 7/2020 Wang .................... G06F 1/1686

FOREIGN PATENT DOCUMENTS

| CN | 107526226 A | 12/2017 |
|----|-------------|---------|
| CN | 108810199 A | 11/2018 |

(Continued)

OTHER PUBLICATIONS

English language translation of Chinese Patent Publication CN107526226. Document downloaded from the EPO at worldwide.espacenet.com on Aug. 21, 2020. English language translation provided onsite by Google Translate tool. (Year: 2017).*

(Continued)

*Primary Examiner* — Angela K Davison
(74) *Attorney, Agent, or Firm* — Syncoda LLC; Feng Ma

(57) ABSTRACT

An electronic device includes a screen module and a light collection functional module. The screen module includes a display member and an electrochromic member. The display member is provided with a light transmitting hole therein. The light collection functional module is arranged below the screen module and corresponds to the light transmitting hole in terms of positions. At least a part of the electrochromic member is fitted with the light transmitting hole to display a color or an image according to a preset state, which includes a light transmitting state and an auxiliary display state. When the electrochromic member is in the light transmitting state, the light collection functional module cooperates with the electrochromic member to obtain lights. When in the auxiliary display state, the electrochromic member shows a color or an image matched with the display member.

9 Claims, 3 Drawing Sheets

(51) Int. Cl.
*G02F 1/1339* (2006.01)
*G02F 1/1333* (2006.01)

(58) Field of Classification Search
CPC ..... G02F 2001/1536; G02F 2001/1347; G02F 2201/44; H04M 1/0264; H04M 1/0266; H04M 2250/16; H04M 2250/52
See application file for complete search history.

(56) References Cited

FOREIGN PATENT DOCUMENTS

| | | |
|---|---|---|
| CN | 109034103 A | 12/2018 |
| CN | 109116656 A | 1/2019 |
| EP | 3605273 A1 | 2/2020 |

OTHER PUBLICATIONS

Extended European Search Report in EP application No. 20151369.4, dated May 15, 2020.
1st Office Action in CN application 201910039526.3, dated Jun. 3, 2021.

\* cited by examiner

ELECTRONIC DEVICE AND SCREEN MODULE

CROSS-REFERENCE TO RELATED APPLICATION

The present disclosure claims priority to Chinese Patent Application No. 201910039526.3, filed on Jan. 16, 2019, the disclosure of which is hereby incorporated herein by reference in its entirety.

BACKGROUND

An increase of a screen-to-body ratio of an electronic device such as a mobile phone can enhance a display effect of a screen, and improve an overall user experience. A light collection functional module such as a front camera may need to cooperate with the screen to achieve a corresponding front light collection function. Typically for a full-screen electronic device, a blind hole arranged in the screen and fitted with the front camera occupies a display region of the screen of the electronic device to provide a light path for the front camera.

SUMMARY

The present disclosure relates to a technical field of electronic technology, and more particularly, to an electronic device and a screen module.

Various embodiments of the present disclosure can provide an electronic device and a screen module to improve a display effect of a screen of the electronic device while reduce a thickness and a structural complexity of the electronic device.

According to a first aspect of embodiments of the present disclosure, an electronic device is proposed, and includes a screen module and a light collection functional module. The screen module includes a display member and an electrochromic member, and the display member is provided with a light transmitting hole therein. The light collection functional module is arranged below the screen module and corresponds to the light transmitting hole in terms of positions. At least a part of the electrochromic member is fitted with the light transmitting hole to display a color or an image according to a preset state. The preset state includes a light transmitting state and an auxiliary display state. When the electrochromic member is in the light transmitting state, the light collection functional module cooperates with the electrochromic member to obtain lights. When the electrochromic member is in the auxiliary display state, the electrochromic member shows a color or an image matched with the display member.

According to a second aspect of embodiments of the present disclosure, a screen module is proposed, and includes a display member and an electrochromic member. The display member is provided with a light transmitting hole therein. At least a part of the electrochromic member is fitted with the light transmitting hole to display a color or an image according to a preset state. The preset state includes a light transmitting state and an auxiliary display state. When the electrochromic member is in the light transmitting state, the electrochromic member has a transparent color. When the electrochromic member is in the auxiliary display state, the electrochromic member shows a color or an image matched with the display member.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

References will now be made in detail to exemplary embodiments, examples of which are illustrated in the accompanying drawings. The following description refers to the accompanying drawings in which the same numbers in different drawings represent the same or similar elements, unless specified otherwise. The implementations set forth in the following description of the exemplary embodiments do not represent all implementations consistent with the present disclosure. Instead, they are merely examples of apparatuses and methods consistent with several aspects of the present disclosure as recited in the appended claims.

A blind hole arranged in the screen and fitted with the front camera occupies a display region of the screen of the electronic device, thus reducing a display area and a display effect of the screen. However, the use of a pop-up camera increases thicknesses and structure complexities of the camera and the electronic device.

The light collection functional module may include one or more of a front camera, a photosensitive sensor, and an auxiliary photographing functional module, which is not limited in the present disclosure. Taking the front camera as an example in the following, a specific structural arrangement of the electronic device will be presented in exemplary descriptions.

Figure 1:
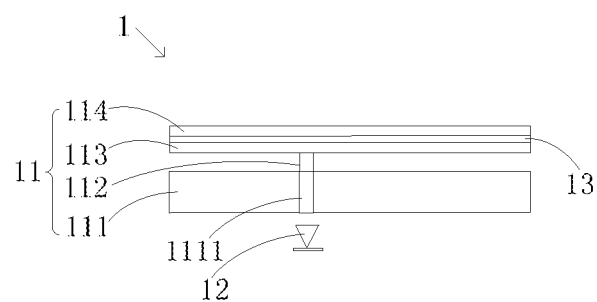
FIG. 1 is a schematic sectional view of an electronic device in some embodiments of the present disclosure.
Figure 2:
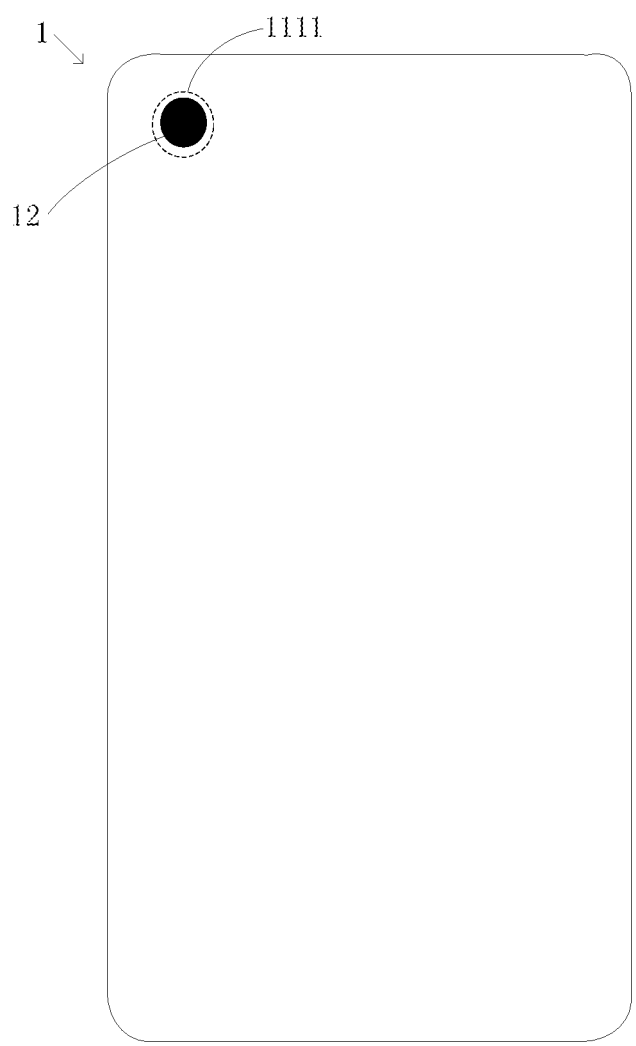
FIG. 2 is a schematic view of an electrochromic member in a power-off state of an electronic device in some embodiments of the present disclosure.
Figure 3:
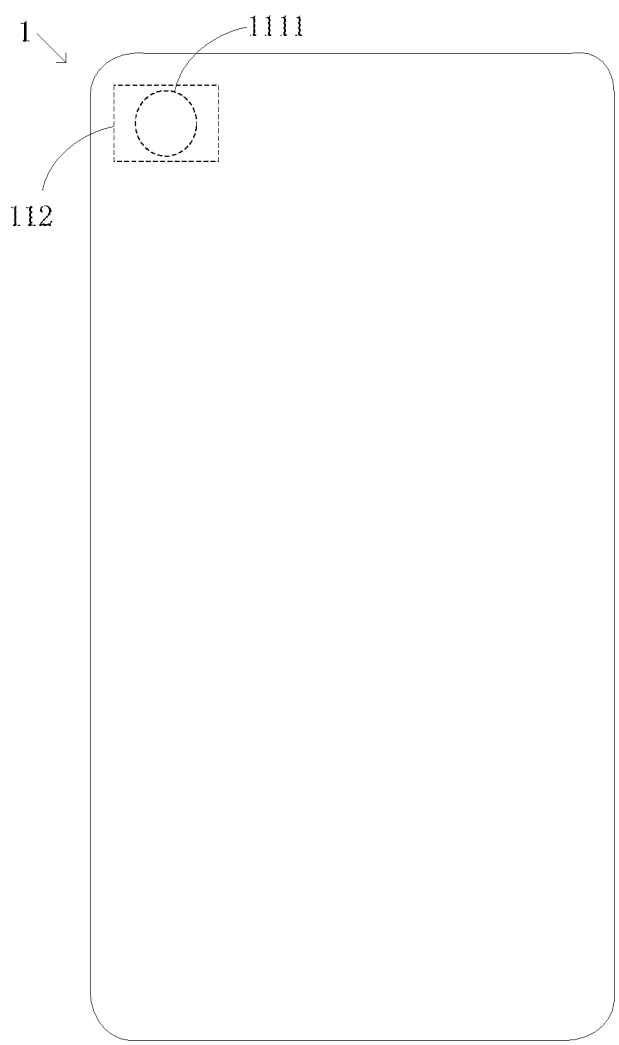
FIG. 3 is a schematic view of an electrochromic member in a power-on state of an electronic device in some embodiments of the present disclosure.

FIG. 1 is a schematic sectional view of an electronic device in some embodiments of the present disclosure. FIG. 2 is a schematic view of an electrochromic member in a power-off state of an electronic device in some embodiments of the present disclosure. FIG. 3 is a schematic view of an electrochromic member in a power-on state of an electronic device in some embodiments of the present disclosure. As illustrated in FIGS. 1, 2 and 3, the electronic device 1 includes a screen module 11 and a front camera 12. The screen module 11 includes a display member 111 and an electrochromic member 112. The display member 111 is provided with a light transmitting hole 1111 therein. The front camera 12 is arranged below the screen module 11 and corresponds to the light transmitting hole 1111 in terms of positions.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

At least a part of the electrochromic member 112 is fitted with the light transmitting hole 1111 to display a color or an image according to a preset state in a controlled manner. The preset state of the electrochromic member 112 includes a light transmitting state and an auxiliary display state. When the electrochromic member 112 is in the light transmitting state, i.e. the electrochromic member 112 allows light transmissions, the front camera 12 corresponding to the light transmitting hole 1111 in terms of positions may cooperate with the electrochromic member 112 to obtain lights and achieve a photographing function. That is, the front camera 12 can obtain the lights through the light transmitting hole 1111 and the electrochromic member 112. When the electrochromic member 112 is in the auxiliary display state, the electrochromic member 112 shows the color or the image, and thus the screen module 11 has a full-screen display effect.

Since the electrochromic member 112 can be controlled, for example by a processor or processing circuit, to switch between the light transmitting state and the auxiliary display state, when the electrochromic member 112 is in the light transmitting state, the electrochromic member 112 may have a transparent color, and the front camera 12 may cooperate with the electrochromic member 112 to obtain the lights to achieve the photographing function. When the electrochromic member 112 is in the auxiliary display state, the electrochromic member 112 shows a pure color, a color block or an image, and thus achieves the full-screen display effect of the screen module 11. The use of the electrochromic member 112 cooperating with the display member 111 and the light collection functional module also reduces the overall thicknesses and the structural complexities of the screen module 11 and the electronic device 1.

It should be noted that when the electrochromic member 112 is in the auxiliary display state, the color or the image shown by the electrochromic member 112 is matched with a color or an image of the display member 111, thereby enhancing the full-screen display effect of the screen module 11.

The specific structure of the screen module 11 will be presented in exemplary descriptions as follows.

In an embodiment, the screen module 11 includes a display member 111, an electrochromic member 112, an encapsulation glass 113 and a cover glass 114. That is, the electrochromic member 112 is arranged in independent of the display member 111, the encapsulation glass 113 and the cover glass 114, and is finally assembled therewith into the screen module 11. The electrochromic member 112 may be an electrochromic film which may be attached to an upper side surface of the display member 111 and correspond to the light transmitting hole 1111 in terms of positions, so as to cooperate with the front camera 12 to be in the light transmitting state or cooperate with the display member 111 to be in the auxiliary display state. The encapsulation glass 113 covers the electrochromic film. The cover glass 114 covers the encapsulation glass 113, and is glued with the encapsulation glass 113 by means of an optical clear adhesive (OCA) 13. The arrangement of the encapsulation glass 113 and the cover glass 114 can encapsulate and protect the display member 111 and the electrochromic member 112, and the OCA 13 used for gluing also reduces the influence on the display effect of the screen module 11 due to its transparence attribute. Alternatively, the electrochromic member 112 may also be directly arranged in the light transmitting hole 1111 of the display member 111 to reduce the overall thickness of the screen module 11, which is not limited in the present disclosure.

Figure 4:
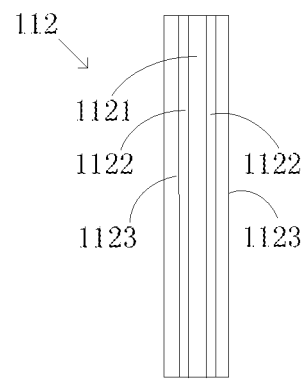
FIG. 4 is a schematic view of an electrochromic member in some embodiments of the present disclosure.

In the above embodiment, as illustrated in FIG. 4, the electrochromic member 112 includes a bistable liquid crystal layer 1121 and a transparent conductive film layer 1122 arranged on each side of the bistable liquid crystal layer 1121. The bistable liquid crystal layer 1121 is controlled by a voltage level, such that the electrochromic member 112 finally shows the color or the image matched with the display member 111. The electrochromic member 112 may be controlled by RGBW (red, green, blue, and white) or RGB technologies, such as having red, green, blue, white pixels, to present various pure colors, color blocks or images matched with the display member 111. In particular, the electrochromism obtained by the RGBW technology have been improved in terms of transmissivity and brightness.

It should be noted that the transparent conductive film layer 1122 may be an indium tin oxides (ITO) film with great electric conductivity and electric resistivity, such that the electrochromic member 112 can obtain a great color display effect.

Furthermore, a protective layer 1123 may be arranged on a side of the transparent conductive film layer 1122 facing away from the bistable liquid crystal layer 1121, so as to protect the transparent conductive film layer 1122 and the bistable liquid crystal layer 1121.

In another embodiment, the electrochromic member 112 includes at least one of an electrochromic cover glass and an electrochromic encapsulation glass. That is, the screen module 11 includes a display member 111 and an electrochromic member 112. The electrochromic member 112 acts as a cover glass 114 or an encapsulation glass 113 of the screen module 11, and also has an electrochromic function. For example, when the electrochromic member 112 is the electrochromic encapsulation glass, the electrochromic encapsulation glass covers the display member 111. When a user needs to use the front camera 12, the electrochromic encapsulation glass is powered off and becomes transparent, such that the front camera 12 can obtain lights through the light transmitting hole 1111 to complete the photographing function. When the user needs the full-screen display effect, the electrochromic encapsulation glass displays the pure color or the color block matched with the display layer in a controlled manner, so as to achieve a complete full-screen display effect.

Figure 5:
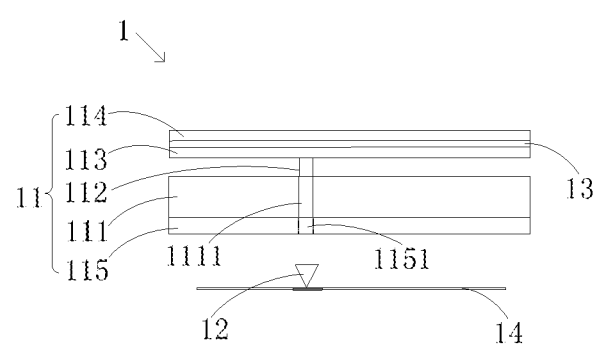
FIG. 5 is a schematic sectional view of an electronic device in another exemplary embodiment of the present disclosure.

In addition, as illustrated in FIG. 5, the screen module 11 also includes a control substrate 115 arranged below the display member 111, and the control substrate 115 includes a light transmitting section 1151 corresponding to the light transmitting hole 1111. When the user needs to use the front camera 12, the light transmitting section 1151 may be fitted with the light transmitting hole 1111 to avoid interfering with the light collection of the front camera 12, such that the front camera 12 can obtain lights through the light transmitting hole 1111 to complete the photographing function.

The electronic device 1 also includes a sliding rail 14 arranged below the screen module 11, and the light collection functional module is slidably mounted to the sliding rail 14. For example, when a plurality of the light collection functional modules, such as the front camera 12, the photosensitive sensor and the auxiliary photographing module, are provided, the front camera 12, the photosensitive sensor and the auxiliary photographing functional module may be slidably mounted the sliding rail 14. By sliding and position switching of the plurality of the light collection functional modules, an alternative fit of the plurality of the light collection functional modules with the light transmitting hole 1111 can be achieved, and finally various types of light collection functions can be achieved, thus simplifying the structure of the electronic device 1 and also enriching the function of the electronic device 1. When the light collection functional module is merely the front camera 12, the camera may also be arranged to the sliding rail 14, such that the front camera 12 may slide to a position corresponding to the light transmitting hole 1111 so as to collect lights when the photographing function is needed, and slide away from the light transmitting hole 1111 when the photographing function is not needed, so as to avoid the influence of the structure of the front camera 12 on the display effect due to the light transmission of the screen module 11.

It should be noted that, the display member 111 may include at least one of an organic light-emitting diode (OLED) and a liquid crystal display (LCD), which may be arranged and assembled according to specific structures and display requirements, which is not limited in the present disclosure.

In the electronic device 1 according to embodiments of the present disclosure, the screen module 11 is provided with the display member 111 and the electrochromic member 112, and the electrochromic member 112 and the light collection functional module are fitted with the light transmitting hole 1111 of the display member 111, respectively. The electrochromic member 112 may switch between the light transmitting state and the auxiliary display state in the controlled manner. When the electrochromic member 112 is in the light transmitting state, the light collection functional module cooperates with the electrochromic member 112 to obtain lights to achieve the light collection function. When the electrochromic member 112 is in the auxiliary display state, the electrochromic member 112 shows the pure color, the color block or the image matched with the display member 111, thus achieving the full-screen display effect of the screen module 11. The use of the electrochromic member 112 cooperating with the display member 111 and the light collection function module also reduces the overall thicknesses and the structural complexities of the screen module 11 and electronic device 1.

It should be noted that the electronic device 1 can be a mobile phone, a tablet computer, and so on, which is not limited in the present disclosure.

The present disclosure further proposes a screen module 11 including a display member 111 and an electrochromic member 112. The display member 111 is provided with a light transmitting hole 1111 therein. At least a part of the electrochromic member 112 is fitted with the light transmitting hole 1111 to display a color or an image according to a preset state in a controlled manner. The preset state includes a light transmitting state and an auxiliary display state. When the electrochromic member 112 is in the light transmitting state, the electrochromic member 112 has a transparent color. When the electrochromic member 112 is in the auxiliary display state, the electrochromic member 112 shows a color or an image, thereby achieving the full-screen display effect of the screen module 11. The use of the electrochromic member 112 cooperating with the display member 111 and the light collection function module also reduces the overall thicknesses and the structural complexities of the screen module 11 and the electronic device 1.

In an embodiment, the screen module 11 includes a display member 111, an electrochromic member 112, an encapsulation glass 113 and a cover glass 114. That is, the electrochromic member 112 is arranged in independent of the display member 111, the encapsulation glass 113 and the cover glass 114, and is finally assembled therewith into the screen module 11. The electrochromic member 112 may be an electrochromic film which may be attached to an upper side surface of the display member 111 and correspond to the light transmitting hole 1111 in terms of positions, so as to cooperate with the front camera 12 to be in the light transmitting state or cooperate with the display member 111 to be in the auxiliary display state. The encapsulation glass 113 covers the electrochromic film. The cover glass 114 covers the encapsulation glass 113, and is glued with the encapsulation glass 113 by means of an optical clear adhesive (OCA) 13. The arrangement of the encapsulation glass 113 and the cover glass 114 can encapsulate and protect the display member 111 and the electrochromic member 112, and the OCA 13 used for gluing also reduces the influence on the display effect of the screen module 11 due to its transparence attribute. Alternatively, the electrochromic member 112 may also be directly arranged in the light transmitting hole 1111 of the display member 111 to reduce the overall thickness of the screen module 11, which is not limited in the present disclosure.

In the above embodiment, the electrochromic member 112 may include a bistable liquid crystal layer 1121 and a transparent conductive film layer 1122 arranged on each side of the bistable liquid crystal layer 1121. The bistable liquid crystal layer 1121 is controlled by a voltage level, such that the electrochromic member 112 finally shows the color or the image matched with the display member 111. The electrochromic member 112 may be controlled by RGBW or RGB technology to present various pure colors, color blocks or images matched with the display member 111. In particular, the electrochromism obtained by the RGBW technology have been improved in terms of transmissivity and brightness.

It should be noted that the transparent conductive film layer 1122 may be an indium tin oxides (ITO) film with great electric conductivity and electric resistivity, such that the electrochromic member 112 may obtain a great color display effect.

Furthermore, a protective layer 1123 may be arranged on a side of the transparent conductive film layer 1122 facing away from the bistable liquid crystal layer 1121, so as to protect the transparent conductive film layer 1122 and the bistable liquid crystal layer 1121.

In another embodiment, the electrochromic member 112 includes at least one of an electrochromic cover glass and an electrochromic encapsulation glass. That is, the screen module 11 includes a display member 111 and an electrochromic member 112. The electrochromic member 112 acts as a cover glass 114 or an encapsulation glass 113 of the screen module 11, and also has an electrochromic function. For example, when the electrochromic member 112 is the electrochromic encapsulation glass, the electrochromic encapsulation glass covers the display member 111. When a user needs to use the front camera 12, the electrochromic encapsulation glass is powered off and becomes transparent, such that the front camera 12 can obtain lights through the light transmitting hole 1111 to complete the photographing function. When the user needs the full-screen display effect, the electrochromic encapsulation glass displays the pure color or the color block matched with the display layer in a controlled manner, so as to achieve a complete full-screen display effect.

Additionally, other structural arrangements of the screen module 11 may be the same with those of the screen module 11 involved in the above embodiments of the electronic device, which will not be repeated herein.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure.

That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An electronic device, comprising:
a screen module comprising a display member and an electrochromic member, the display member being provided with a light transmitting hole therein; and
a light collection functional module arranged below the screen module and corresponding to the light transmitting hole in terms of positions,
wherein at least a part of the electrochromic member being fitted with the light transmitting hole and configured to display a color or an image according to a preset state,
wherein the preset state comprises a light transmitting state and an auxiliary display state;
the light collection functional module is configured to cooperate with the electrochromic member to obtain lights when the electrochromic member is in the light transmitting state; and
the electrochromic member is configured to show a color or an image matched with the display member when the electrochromic member is in the auxiliary display state,
wherein the electrochromic member comprises a bistable liquid crystal layer and a transparent conductive film layer arranged on each side of the bistable liquid crystal layer, and the bistable liquid crystal layer is controlled by a voltage level, such that the electrochromic member shows the color or the image matched with the display member,
wherein the screen module further comprises an encapsulation glass, the electrochromic member comprises an electrochromic film attached on an upper side surface of the display member and corresponding to the light transmitting hole in terms of positions, the encapsulation glass covers the electrochromic film, and the electrochromic film is sandwiched between the display member and the encapsulation glass,
wherein the electronic device further comprises a sliding rail arranged under the screen module, the light collection functional module is arranged to the sliding rail and configured to slide relative to the sliding rail without extending past an outer perimeter of the electronic device, and
a plurality of the light collection functional modules are arranged to the sliding rail and configured to slide relative to the sliding rail to switch their positions so as to be fitted with the light transmitting hole, respectively.

2. The electronic device according to claim 1, wherein the screen module further comprises a cover glass, and the cover glass covers the encapsulation glass and is glued with the encapsulation glass by means of an optical clear adhesive.

3. The electronic device according to claim 1, wherein the electrochromic member further comprises a protective layer arranged on a side of the transparent conductive film layer facing away from the bistable liquid crystal layer.

4. The electronic device according to claim 1, wherein when the electrochromic member is in the auxiliary display state, the color or the image shown by the electrochromic member is matched with a color or an image of the display member.

5. The electronic device according to claim 1, wherein the screen module further comprises a control substrate arranged below the display member, and the control substrate comprises a light transmitting section corresponding to the light transmitting hole.

6. The electronic device according to claim 1, wherein the electrochromic member comprises red, green, blue, and white (RGBW) pixels, and the transparent conductive film layer is composed of an indium tin oxides (ITO) film.

7. The electronic device according to claim 1, wherein the electronic device is a mobile phone and comprises a liquid-crystal display (LCD) or an organic light-emitting diode display (OLED) screen.

8. The electronic device according to claim 7, further comprising a processing circuit configured to control the electrochromic member to switch between the light transmitting state and the auxiliary display state.

9. The electronic device according to claim 8, wherein upon the electrochromic member being in the auxiliary display state, the electrochromic member is configured to show a pure color, a color block or an image, thereby achieving a full-screen display effect of the screen module.

* * * * *